United States Patent [19]

Mitchell et al.

[11] Patent Number: 4,991,925
[45] Date of Patent: Feb. 12, 1991

[54] SPECTRUM SHIFTING OPTICAL SWITCH

[75] Inventors: Gordon L. Mitchell, Woodinville; Elric W. Saaski, Bothell, both of Wash.

[73] Assignee: MetriCor, Woodinville, Wash.

[21] Appl. No.: 253,239

[22] Filed: Oct. 4, 1988

[51] Int. Cl.⁵ .......................... G02B 6/26; G02B 6/42
[52] U.S. Cl. .................................................. 350/96.15
[58] Field of Search ........................... 350/96.15, 96.20

[56] References Cited

U.S. PATENT DOCUMENTS

| | | | |
|---|---|---|---|
| 4,650,277 | 3/1987 | Husher et al. | 350/96.15 |
| 4,702,549 | 10/1987 | Duck et al. | 350/96.15 |
| 4,705,354 | 11/1987 | Ulrich | 350/96.15 |
| 4,805,985 | 2/1989 | Fleck | 350/96.15 |

OTHER PUBLICATIONS

Silicon as a Mechanical Material, Proceeding of the IEEE, vol. 70, No. 5, May 1982, by Kurt Peterson.
Field Assisted Glass Sealing, Electrocomponent Science & Technology, Jan. 1975, vol. 2, No. 1, pp. 45-53, by George Wallis.
Reference Cited in Office Action, 03/02/89–Patent No. 4,678,904 as Patent No. 4,628,904 (double patenting).

Primary Examiner—William L. Sikes
Assistant Examiner—Robert E. Wise
Attorney, Agent, or Firm—Seed and Berry

[57] ABSTRACT

A spectrum shifting optical switch in which an optical beam splitter couples input light from a light source to a manually movable spectral modulation element and couples output light from the spectral modulation element to a light detector. The spectral modulation element may be an optically resonant cavity having a manually movable diaphragm, thereby changing the resonant wavelength of the cavity. As a result, the wavelength spectrum of the input light is altered by the resonant wavelength of the cavity. The spectral modulation element may also be an optical filter through which the input light passes. The resulting spectral modulation of the input light is detected to determine the position of the resilient diaphargm or filter.

28 Claims, 6 Drawing Sheets

SPECTRUM SHIFTING OPTICAL SWITCH

TECHNICAL FIELD

This invention relates to switches, and more particularly, to an optical switch that generates a shift in the spectrum of light when it is actuated.

BACKGROUND ART

Conventional electrical switches use a moving contact to change from the "off" to "on" state or from a normally open to a normally closed position. Withstanding moderate currents makes these contacts relatively large; and tolerating high voltages, for example, 250 volts, between the contacts increases contact separation. This property makes the fabrication of small switches difficult and, in some cases, reduces the longevity of the switch contacts.

Electrical switches are used in many applications. However, they have problems when applied to explosive environments because spark hazards which exist from contact opening and closing can cause ignition of the surrounding atmosphere. In these situations, the switches are typically sealed to prevent explosion problems. This increases the cost of the switches by orders of magnitude.

Other situations where electrical switches are not welcome involve applications where the wires which connect to the switches become a system liability. Two examples of this sort are where, in military systems, electromagnetic pulses from nuclear explosions can generate spurious signals or even damage electrical circuits. Another problem area is in the unwanted radiation of signals. This is a particular concern in equipment which is used for the transmission or encryption of classified information. When conventional switches are used in this application, the opposite process takes place. That is, radiation from the wires connected to the switches may be detected, thereby allowing disclosure of the classified information.

Replacing these wires with optical fibers is attractive in the situations described above. It is possible to mimic electrical switches, for example, by selectively altering the position of a mirror. Thus, switch action may rotate a mirror, allowing light coming from a light source along a fiber to be directed to either one of two other optical fibers, each communicating with a respective photodetector. Such systems, although simple in concept, are difficult to fabricate and involve several disadvantages. First, the fact that three fibers are required increases system cost if the distance traveled is more than a few meters or if complex connectors are required between the switch and electronics. Generally, alignment of a scheme of this sort is a problem because the mirror must be positioned within a very tight tolerance in order to couple light back into the fiber.

A single-fiber version of a movable mirror optical switch can be implemented by selectively moving a mirror in a plane between two positions, one of which is directly in front of the outlet end of an optical fiber. When the mirror is positioned in front of the outlet end of the fiber, light from the light source is reflected by the mirror back along the same fiber toward a photodetector at the other end. Although this single-fiber system is simpler than the above-described two-fiber system, it suffers from another problem which is common to all duplex fiber links. That is, light backscattered from the source end of the fiber gets into the detector. Also, Rayleigh backscattering and back reflection from connectors along the system reduce the available signal to noise in the detector circuit. Variations in the amount of the losses, backscattering and back reflection can result in ambiguities in the intensity of the detected light. In other words, for a given arrangement, the detected light for optimal conditions where the mirror is not positioned in front of the fiber can be greater than when the mirror is positioned in front of the fiber, but losses, backscattering and back reflection are less than optimal. Additionally, single-fiber systems suffer from a problem if connectors are present because, as a connector removed and replaced, it may have completely different light transmission and reflection characteristics, causing the system to not be able to differentiate between the presence or absence of the mirror at the fiber end.

DISCLOSURE OF INVENTION

It is an object of the invention to provide an optical switch that is not affected by and does not generate electromagnetic fields in lines connected to the optical switch.

It is another object of the invention to provide an optical switch that is incapable of generating sparks upon being actuated and is thus safe for use in an explosive environment.

It is still another object of the invention to provide an optical switch that is insensitive to variations in the intensity of light interrogating the switch or to variations in the losses and backscattering in the fiberoptic waveguides coupling the interrogating light to the switch.

It is a further object of the invention to provide an optical switch that can assume a variety of operating modes analogous to conventional electric switches.

These and other objects of the invention are provided by an optical switch receiving input light having a predetermined spectrum of wavelengths. The switch includes a spectral modulation element that is movable between at least two positions to modulate the predetermined spectrum and at least one of the positions. The spectrally modulated light is applied to a light detector to provide an indication of the position of the spectral modulation element. A manually actuatable member is connected to the spectral modulation element by a mechanical linkage, thereby allowing the spectral modulation element to be manually moved between positions so that the state of the switch is indicated by the wavelength spectrum from the switch. The spectral modulation element may be an optical filter that is positioned between a light port and a reflector in a first state and is removed from its former position in a second state. Input light from the light port passes through the filter and is directed by a reflector back through the filter to the light port so that light having its wavelength spectrum modulated by the filter is an indication of the position of the filter. The spectral modulation element may also be an optically resonant cavity having a thickness defined by a movable diaphragm. The diaphragm is connected to the manually actuatable member by a mechanical linkage so that actuation of the manually actuatable member moves the diaphragm between two positions to alter the resonant wavelength of the cavity. It can also be actuated as a pressure sensor in a closed volume which is compressed. Input light having a wavelength spectrum encompassing the resonant wavelength of the cavity is directed into the optically resonant cavity and then from the switch so that the wavelength spectrum of the light from the switch is the wavelength spectrum of the input light modulated by the resonant wavelength of the cavity corresponding to the position of the diaphragm.

BEST MODE FOR CARRYING OUT THE INVENTION

The principal components of backscattered light are connector Fresnel reflections and poor coupler performance. These components are spectrally flat; that is, they have an equal amount of reflection for all the wavelengths present in the light source. This means that a method of sensing returned light which can differentiate between one wavelength and another is inherently able to circumvent not only the backscattering but also system loss characteristics.

Figure 1:
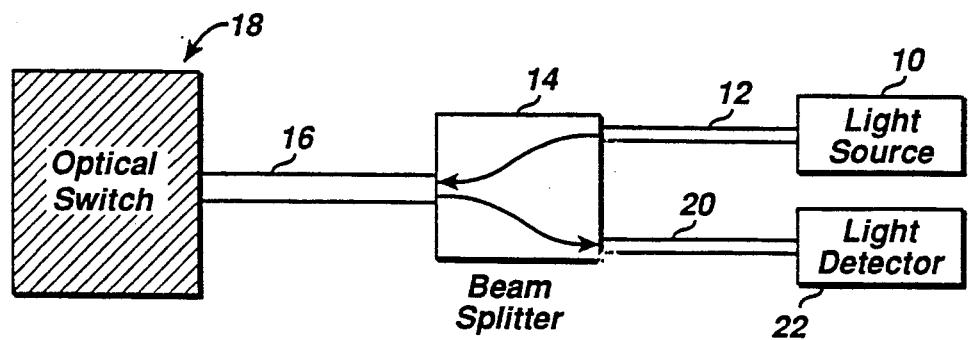
FIG. 1 is a schematic showing a spectrum shifting optical switch and associated detector.

One concept of an optical spectrum shifting switch employing these characteristics is illustrated in FIG. 1. Basically, a light source 10 generates input light which either may be monochromatic or may be composed of a range of wavelengths falling within one or more color bands. More specifically, the light source 10 may be a laser, multiple lasers or a light-emitting diode (LED).

Input light from the light source 10 is coupled through a first fiberoptic waveguide 12 of conventional design to a first input port of a beam splitter 14, described in greater detail below. A second fiberoptic waveguide 16 extends from a second port of the beam splitter 14. The beam splitter 14 functions to couple light from the first fiberoptic waveguide 12 at the first port of the beam splitter 14 into the second fiberoptic waveguide 16 through the second port of the beam splitter 14. Light conveyed through the fiberoptic waveguide 16 then reaches an optical switch 18, described in detail below. Basically, optical switch 18 modifies the spectrum of light incident on the switch 18 and reflects back the spectrally modulated light. For example, the switch 18 may decrease input light at one wavelength with respect to light at another wavelength. The spectrally modulated light reflected from the optical switch 18 is then coupled to the second port of the beam splitter 14 through fiberoptic waveguide 6. Beam splitter 14 then functions to couple the reflected light to a third fiberoptic waveguide 20 through a third port of the beam splitter 14. The reflected light coupled through fiberoptic waveguide 20 is then sensed by a light detector 22, which may be, for example, a combination of conventional photodetectors and spectra splitter.

Figure 2:
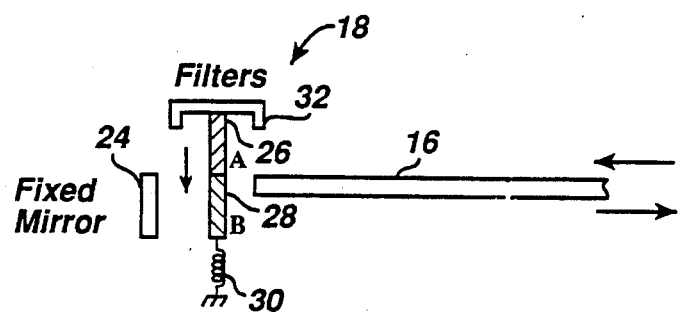
FIG. 2 is a schematic showing one embodiment of a spectrum shifting optical switch.

The optical switch 18 may be any device that is manually actuated to shift or otherwise modulate the spectrum of the light incident on the switch 18 and reflect the light having the shifted or modulated spectrum back into the fiberoptic waveguide 16. One such device is illustrated in FIG. 2. The embodiment of FIG. 2 utilizes a fixed mirror 24 positioned at the output end of fiberoptic waveguide 16. The inclination of the mirror is preferably adjustable to allow the mirror 24 to be precisely aligned with the axis of the fiberoptic waveguide 16 by conventional means. Once the inclination of the mirror 24 is set, the mirror 24 remains aligned since it does not move during use. The switch 18, which is, for example, of the momentarily actuatable type, includes a pair of filters 26, 28 connected to each other. The filters 26, 28 have color characteristics that differ from each other so that the spectrum of input light passing through filter 26 is different from the spectrum of light passing through filter 28. Input light passes through one of the filters 26, 28 and is reflected by the mirror 24 back through the filter 26 or 28 and into the fiberoptic waveguide 16 to a suitable detector. The filters 26, 28 are biased upwardly by a spring 30 so that the input light normally passes through filter 28. The switch 18 is actuated by depressing key or button 32, thereby shifting the filters 26, 28 downwardly so that filter 26 is positioned between the fiberoptic waveguide 16 and the mirror 24. Other mechanisms for shifting the filters 26, 28 can, of course, be employed, including conventional latch mechanisms for keeping either filter 26, 28 in front of the mirror 24 until actuated.

Figure 3:
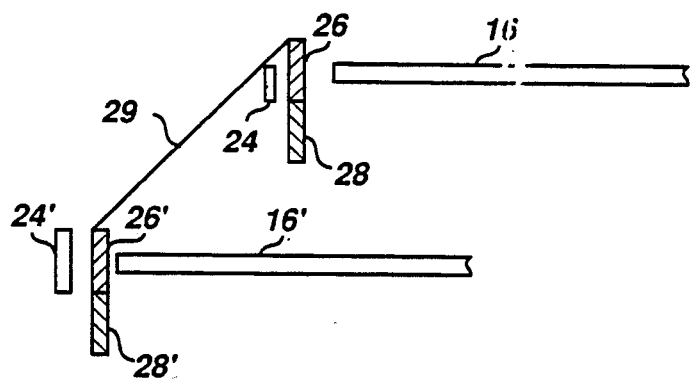
FIG. 3 is a schematic showing a double-pole spectrum shifting optical switch.

Multiple-pole switches may be implemented by interconnecting two sets of filters 26, 28 and 26', 28' through a linkage 29, as illustrated in FIG. 3.

Figure 4:
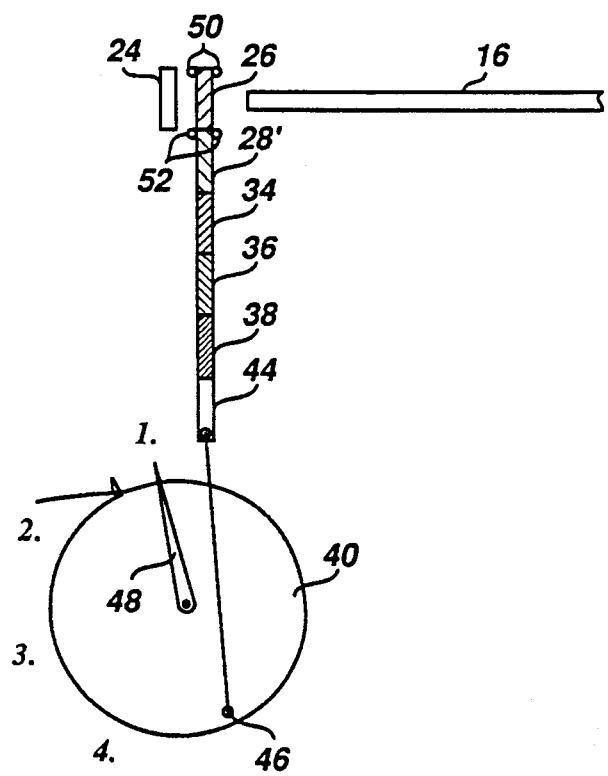
FIG. 4 is a schematic showing a multiple-throw spectrum shifting optical switch.

Multiple-throw switches may also be implemented by utilizing more than two filters 26, 28, as illustrated in FIG. 4. The four-throw switch illustrated in FIG. 4 allows any of five filters 26, 28, 34, 36 or 38 to be positioned between the fiberoptic waveguide 16 and mirror 24. Any suitable mechanism for moving the filters 26, 28, 34, 36, 38 vertically can be used. For example, in FIG. 4 the filters 26, 28, 34, 36, 38 are connected to a rotatably mounted wheel 40 by a linkage 42 that is pivotably connected to the filters and wheel 40 at 44 and 46, respectively. A pointer 48 is fixedly mounted on the wheel 40 and is positioned opposite indicia "1"–"4" to indicate the position of the switch. Roller pairs 50, 52 fix the positions of the filters 26, 28, 34, 36, 38 while allowing them to move vertically. The multiple-throw switch of FIG. 4 can also be combined with the multiple-pole switch of FIG. 3 to produce a multiple-pole, multiple-throw switch. This concept can be extended to a filter with continuously varying spectral properties along its length.

Figure 5:
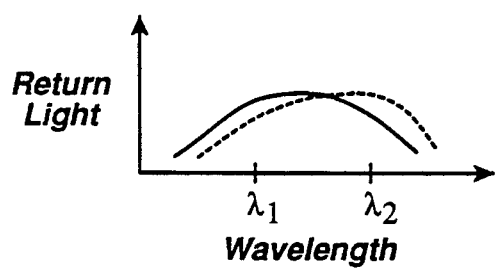
FIG. 5 is a graph showing the shift in the spectrum of light reflected from the optical switches of FIGS. 2-4.

The resulting photodetector signal from the optical switches of FIGS. 2–4 shifts as a function of filter placement, as illustrated in FIG. 5. Peak wavelengths as 1 and 2 are shown to vary with respect to one another as the switch 18 is operated between two different filters. Because a small wavelength shift can be easily detected on a large background signal, operation of the switch and tolerance for large amounts of backscatter or lost light are much simpler than with prior art systems described above.

Figure 6:
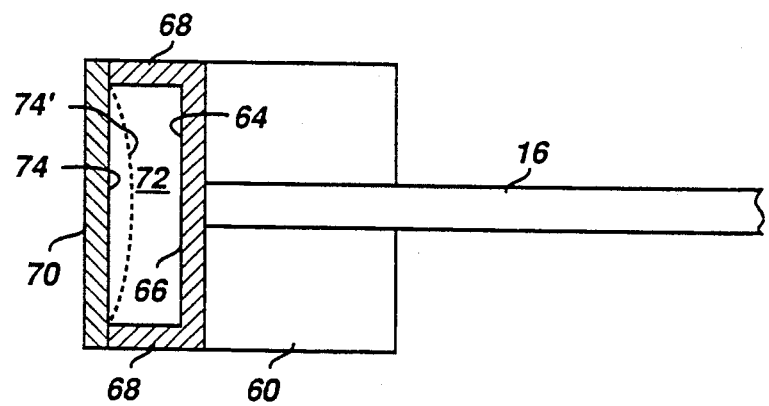
FIG. 6 is a cross-sectional view of a Fabry-Perot interferometer-type optical switch.

A spectrum shifting optical switch can also be implemented using a Fabry-Perot interferometer, as illustrated in FIG. 6. The optical switch of this embodiment may include a support 60 through which the fiberoptic waveguide 16 extends. The support 60 carries a substrate 62 consisting of a base 64 having a planar surface 66 surrounded by sidewalls 68. The base 62 is preferably circular and the sidewalls 68 are preferably cylindrical. A resilient diaphragm 70 is bonded to the edges of the sidewalls 68 to form a cavity 72. Alternatively, the sidewalls 68 may be integrally formed with the diaphragm 70, and the sidewall 68 may be bonded to the substrate 62. The inside surface 74 of the diaphragm 70 is planar, or bowed by mechanical and atmospheric pressure. Surface 74 serves as an optical reflector forming a resonant cavity with surface 66. It is parallel to the planar inside surface 66 of the base 64. The thickness of the cavity 72 (i.e., the distance between the inside surface 66 of the base 64 and the inside surface 74 of the diaphragm 70) is selected so that the input light incident through fiberoptic waveguide 16 resonates in the cavity 72 at a predetermined wavelength. Cavity 72 thus forms an optical resonator. As is well understood in the art, the resonant wavelength of the cavity 72 is dependent upon the thickness of the cavity 72. Thus, deflecting the diaphragm 70 inwardly or outwardly alters the thickness of the cavity 72 and hence its resonant wavelength or resonant frequency. The diaphragm 70 is formed by a resilient material so that it can deform inwardly when the external pressure is applied.

The Fabry-Perot interferometer of FIG. 6 can operate as a switch by manually depressing the diaphragm 70 to the position illustrated in phantom at 74' using a variety of mechanical linkages, some of which are described below. Manually depressing the diaphragm 70 alters the dimensions and shape of the cavity 72 and hence its resonant wavelength.

In order to maximize the spectral modulation, the inside surface 64 of the base 62 is preferably provided with a partially light-transmissive, partially reflective coating, while the inside surface 74 of the diaphragm 70 is provided with a reflective coating.

The theory of operation of the optical switch and its associated detection system depends upon the characteristics of the reflectivity curves of the switch 18 in response to input light. Basically, the reflectivity curve undergoes a shift, known as a "microshift," when the resonant frequency of the cavity 72 shifts responsive to small manually produced deformations of the diaphragm 70. The reflectivity (R) of the optically resonant cavity 72 is given by the equation:

$$R = 1 - s^2 / ((1-r)^2 + 4r\sin^2(theta))$$

where $s = (s_1 \cdot s_2)^{0.5}$ and $r = (r_1 \cdot r_2)^{0.5}$. The quantities $s_1$, $s_2$ are, respectively, the transmittances of reflective surfaces 66, 74, while $r_1$, $r_2$ are, respectively, the reflectances of reflective surfaces 66, 74 as seen from within the cavity 72.

The angle theta in the sine term in the above equation is known to be given by:

$$theta = 2(pi)nt \cdot \cos(phi)/lambda + e$$

where:
n = the refractive index of whatever is in the cavity 36 between reflective surfaces 66, 74;
t = the distance between reflective surfaces 66, 74;
phi = the angle of light reflection between reflective surfaces 66, 74;
lambda = the wavelength of input light incident in optically resonant cavity 72; and
e = any phase shift caused by refection from either reflective surface 66, 74.

Figure 7:
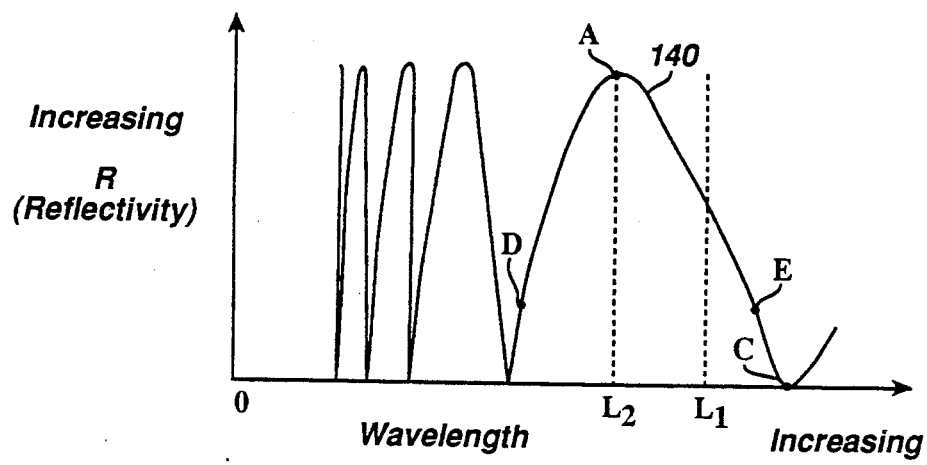
FIG. 7 is a graph showing the reflectivity of the optical switch of FIG. 6 as a function of the wavelength of light applied to the switch.

A typical reflectivity curve 140 is illustrated in FIG. 7. The reflectivity R is a periodic function of the wavelength of the input light, as can be seen by examining the equation set forth above. Specifically, it can be seen that the reflectivity R is a periodic function of the parameter group nt.cos (phi)/lambda. The maximum reflectivities thus occur at nt.cos (phi)/lambda = (2m+1)/4, while the minimum reflectivities occur at nt.cos (phi)/lambda = m/2; where m is the cycle number and is 0 or a positive integer. It is thus seen that adjacent maxima and minima are separated from each other by exactly one-quarter of the parameter group nt.cos (phi)/lambda. Insofar as the thickness T of the cavity 72 varies according to the deflection of the diaphragm 70, it can be seen that the parameter group nt.cos (phi)/lambda will vary in accordance with the deflection.

Figure 8:
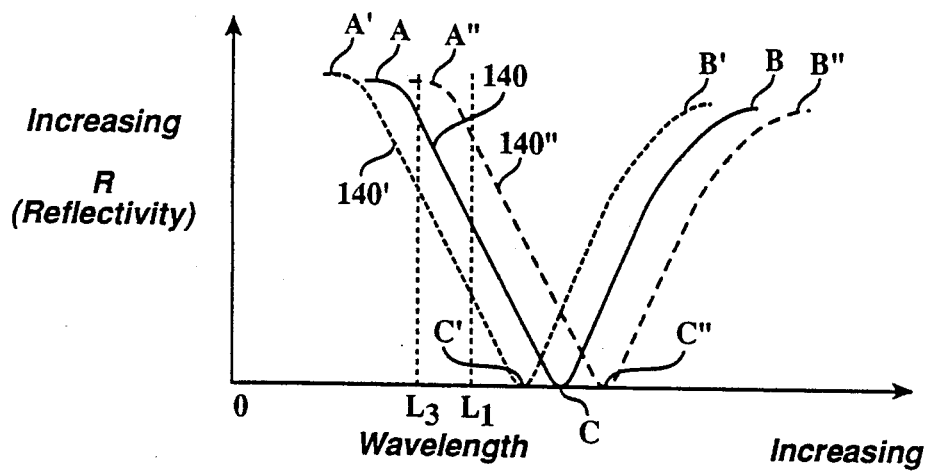
FIG. 8 is a graph of the reflectivity of the optical switch of FIG. 6 for various resonant wavelengths of the switch.

FIG. 8 illustrates the microshift of the reflectivity curve 140 to positions 140' and 140" responsive to variations in the thickness T of the cavity 72. In particular, the reflectivity curve 140 shifts to the left with respect to the wavelength $L_1$ of input light from light source 10 to the reflectivity curve 140' when the thickness T of the cavity 72 is reduced responsive to inward deflection of the diaphragm 70. Similarly, the reflectivity curve 140 is shifted to the right with respect to the wavelength $L_1$ to become reflectivity curve 140" when the thickness T of the cavity 72 increases responsive to outward deflection of the diaphragm 70. The distance between adjacent maxima or adjacent minima is termed a "cycle length." It will be apparent from an examination of FIG. 8 that a given value of reflectivity will occur at two points for each cycle of the reflectivity curve. Thus, in order to achieve a unique reflectivity for a given deformation, the optical switch must be kept within a range or "operating segment" of one-half resonance cycle extending between an adjacent maxima and minima. For example, curve A–C and C–B each constitute an operating segment in one resonance cycle of reflectivity curve 140. This requirement is easily met since only the existence of a shift is important. The amount of the shift need not be determined.

Assuming that the light source 10 emits input light having a wavelength $L_1$, it will be apparent that when the reflectance curve 140 shifts to the position 140' responsive to an inward deflection of the diaphragm 70, the amplitude of the spectrally modulated input light received at light detector 22 will decrease. Similarly, when the reflectivity curve 140 microshifts to the position 140'' responsive to outward deflection of the diaphragm 70, the amplitude of the spectrally modulated light sensed at detector 22 will increase. As mentioned above, light detector 22 may be a variety of light-sensitive devices, such as a photodetector, which, when connected in known circuits, may produce an electrical output having a magnitude that is proportional to the intensity of the incident light.

Although the detection system illustrated in FIG. 1 will produce an output that is proportional to the deformation of the diaphragm 70 when connected to the switch 18 of FIG. 6, it suffers from a number of potential limitations because the intensity of the output light applied to the light detector 22 may vary for reasons other than microshifts of the reflectivity curve 140. For example, the intensity of the light received by the light detector 22 will vary in accordance with variations in the intensity of the input light generated by the light source 10. Also, variations in the losses and leakages in the fiberoptic waveguides 12, 16, 20 will result in variations in the light at the light detector 22. For these reasons, a ratiometric system, illustrated in FIG. 9, may be used as the light detector 22. In the ratiometric system, output light from the beam splitter 14 and waveguide 20 is incident on a second beam splitter 150, which passes a portion of the incident light to a short-pass optical filter 152. The short-pass optical filter 152 preferentially transmits light having a wavelength that is shorter than a predetermined wavelength. The shorter wavelength light from filter 152 is converted to a first electrical signal by a light detector 154, which may be a conventional photodetector circuit. The output of the light detector 154 is then boosted by amplifier 156.

The portion of the light reflected by beam splitter 150 is incident on a long-pass optical filter 160. The long-pass optical filter 160 preferentially transmits light having a wavelength longer than a predetermined value. The long wavelength light passing through filters 160 is converted to a second electrical signal by a light detector 162. The output of the light detector 162 is then boosted by an amplifier 166.

The amplified first and second electrical signals from amplifier 156, 166, respectively, are applied to a conventional calculation circuit 168. Calculation circuit 168 may be a conventional divider circuit that generates an output that is proportional to the ratio of the amplitude of the signal of the output of amplifier 156 to the amplitude of the signal at the output of amplifier 166. The calculation circuit 168 may also be a conventional differential amplifier that generates an output that is proportional to the difference between the amplitude of the signal at the output of amplifier 156 and the amplitude of the signal at the output of amplifier 166. In either case, it will be apparent that any variations in the intensity of the light from the light source 10 as well as variations in the losses or leakage in the fiberoptic waveguides 12, 16, 20 will result in equal variations in the light at both light detectors 154, 162. As a result, the output of the calculation circuit 168 is unaffected by such variations. The output of the calculation circuit 168 is preferably applied to a conventional threshold circuit having a binary output indicative of the two states of the optical switch 18.

Figure 9:
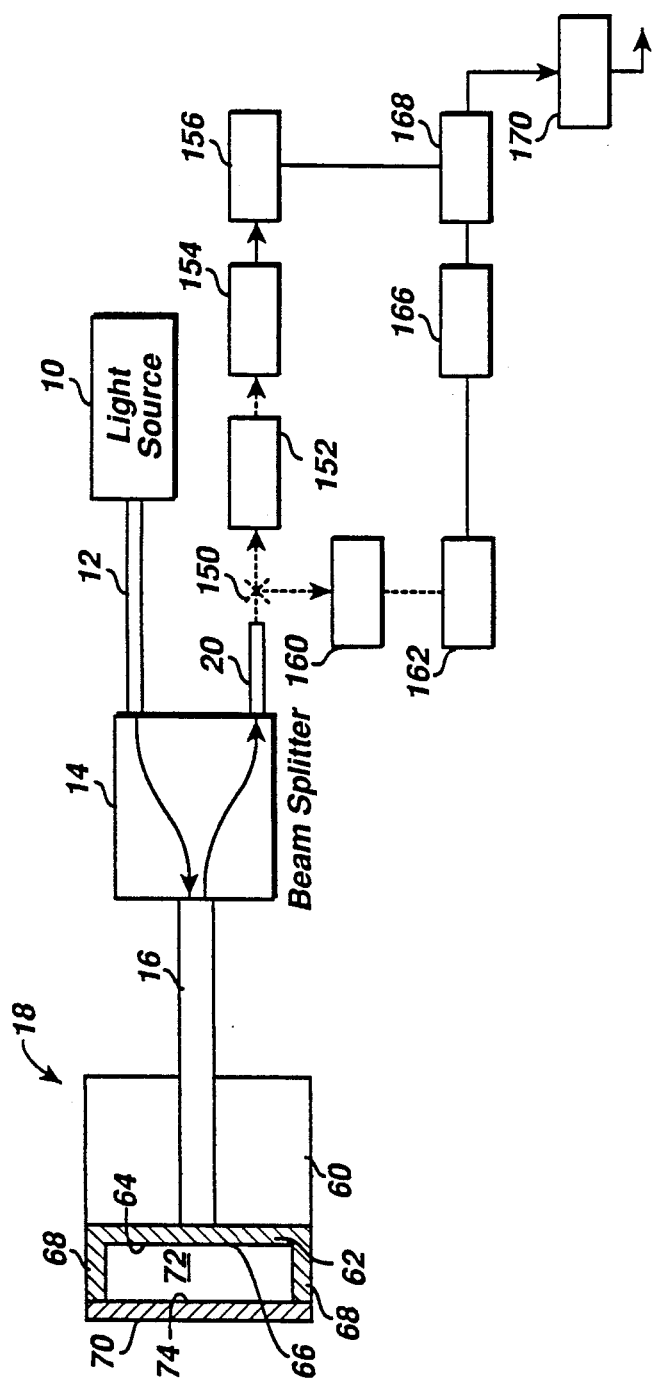
FIG. 9 is a schematic of a detection system for the optical switch of FIG. 6 utilizing a ratiometric or differential light-detection technique.
Figure 10:
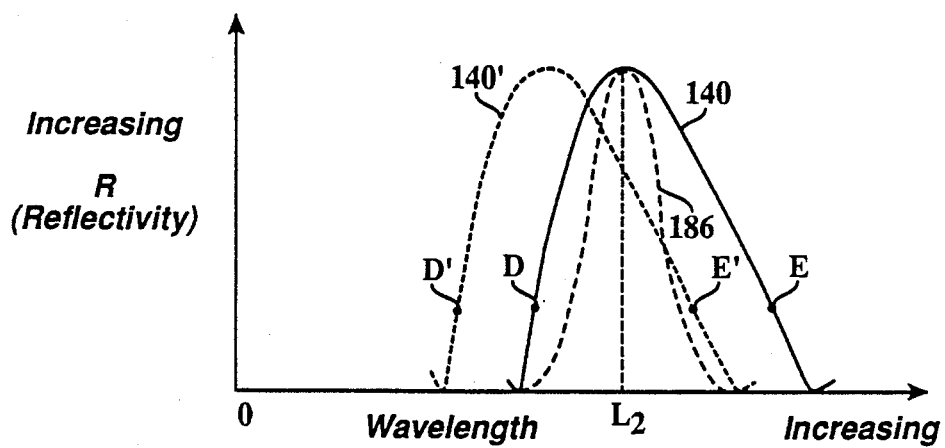
FIG. 10 is a graph of the reflectivity curve of the optical switch of FIG. 6 used in the detection system of FIG. 9 for two different resonant wavelengths of the switch plotted against the frequency spectrum of the light incident on the optical switch.
Figure 11:
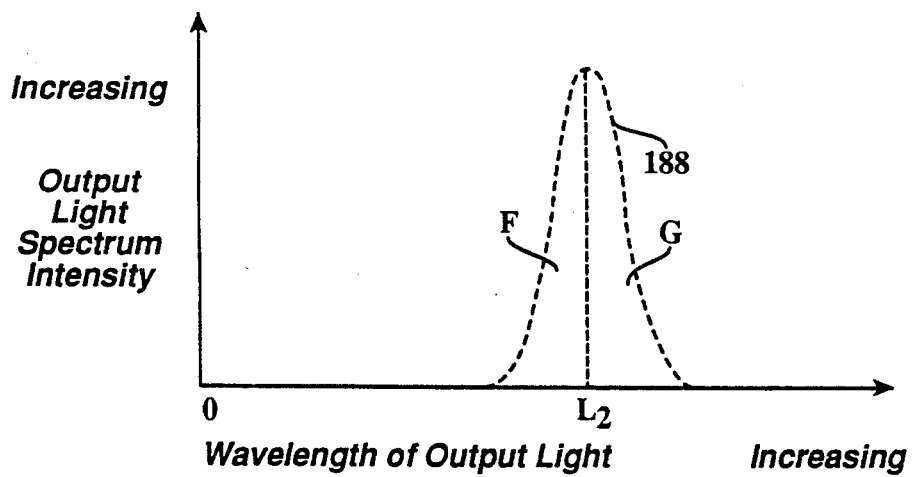
FIG. 11 is a graph showing the spectrum of light reflected from the optical switch of FIG. 6 when the spectrum of the incident light is symmetrically positioned about the resonant wavelength of the optical switch.

The embodiment illustrated in FIG. 9 must utilize a light source 10 that emits input light having either at least two wavelengths or a range of wavelengths. In contrast, the light source 10 of the embodiment of FIG. 1, preferably emits light having a single or relatively narrow band of wavelengths. The frequency spectrum of one such light source 10 is illustrated in FIG. 10 as curve 186. Also illustrated in FIG. 10 is a portion of the reflectivity curve 140, which is selected to have a resonant wavelength or maxima coinciding with the wavelength of the highest intensity light from the light source 10. However, it will be understood that the resonant wavelength of the cavity 72 and the wavelength of highest intensity from the light source 10 need not coincide. When the resonant wavelength coincides with the wavelength of maximum intensity from the light source 10, the output light incident on the beam splitter 150 will have the spectrum illustrated in FIG. 11. Since the light having wavelengths longer than wavelength $L_2$ is modified by the reflective curve 140 to the same extent as the light having a wavelength shorter than the wavelength $L_2$, the spectrum of light incident on the beam splitter 150 is symmetrical about wavelength $L_2$, as illustrated in FIG. 11. If the cutoff wavelength of the short wavelength filter 152 and the long wavelength filter 160 are selected at $L_2$, the output from light detector 154 will have an amplitude equal to the area F, while the output of light detector 166 will have an amplitude equal to the area G. Under these circumstances, the output of the calculation circuit 168, when implemented as a divider, will be unity and, when implemented as a differential amplifier, will be zero. A similar result will be achieved even if the cutoff wavelengths for the filters 152, 160 do not coincide, as long as the filters 152, 160 preferentially pass some wavelengths of the light from light source 10 to a greater degree than other wavelengths.

Figure 12:
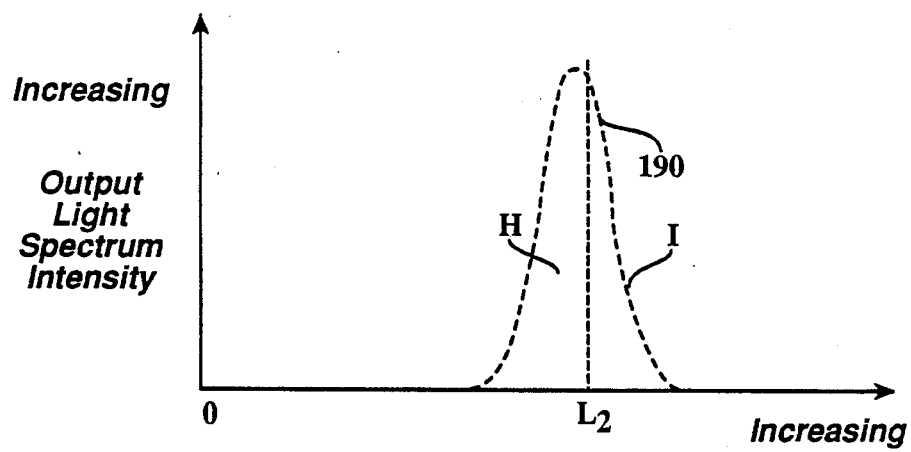
FIG. 12 is a graph of the spectrum of the light reflected from the optical switch of FIG. 6 when the incident light is centered at a wavelength that is larger than the resonant frequency of the optical switch.

In the event that the diaphragm 70 of the optical switch 18 is deflected inwardly, the reflectivity curve illustrated in FIG. 10 will shift from the position 140 to the position 140'. The spectrum 186 of the light from the light source 10 will thus be altered to the spectrum illustrated in FIG. 12. In other words, since the reflectivity curve 140 has shifted to the position 140', light having a wavelength shorter than $L_2$ is reflected to a degree greater than the reflection of light having wavelengths greater than a wavelength $L_2$. As in the example given above, light having a wavelength shorter than $L_2$ is preferentially applied through short wavelength filter 152 to the light detector 154. The output of light detector 154 will thus have an amplitude corresponding to the area H. Light having a wavelength greater than $l_2$ is preferentially applied through long wavelength filter 160 to light detector 162 so that light detector 162 generates an output having an amplitude corresponding to the area I. As a result, the output of calculation circuit 168, when implemented as a divider, will be equal to the ratio of area H to area I and, when implemented as a differential amplifier, will be equal to the difference between the area H and the area I.

It can be shown that the embodiment of FIG. 9 can generate a unique ratiometric output for diaphragm microshifts approaching one operating cycle. This is in contrast to a one-half resonance cycle maximum for the embodiment of FIG. 1, which is intensity-based.

Figure 13:
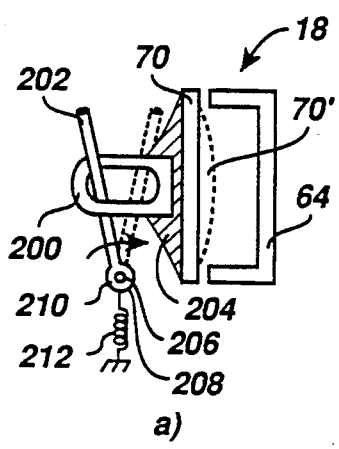
FIG. 13 is a schematic showing one mechanical linkage system for actuating the optical switch of FIG. 6 in a "snap action" mode.

Mechanical coupling between a manually actuatable switch lever mechanism and the sensor 18 can be accomplished through a variety of mechanical linkages or members. One example, illustrated in FIG. 13, utilizes a loose fitting collar 200 which allows movement of an actuating lever 202 within a range before it deflects the diaphragm 70 through a resilient material 204 which fastens the collar 200 to the diaphragm 70. The actuating lever 202 is pivotably mounted at 206 and its lower end has formed therein a cam 208 having a lobe aligned with the longitudinal axis of the lever 202. A cam follower 210 is resiliently biased against the cam 206 by a compression spring 212. The cam 206 and cam follower 210, together with the spring 212, cause the actuating lever 202 to be biased to either of two positions, one of which deflects the diaphragm 70 through the resilient material 204. The optical switch element 18 in conjunction with the mechanical linkage of FIG. 13 is thus a "snap action" switch that operates in an analogous manner to conventional "snap action" electrical switches. The optical switch 18 of FIG. 9 can also be used to replace electrical contacts of conventional relays and switches producing their optical equivalents.

Figure 14:
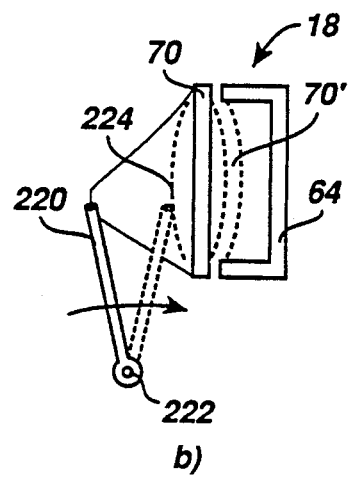
FIG. 14 is a schematic showing another mechanical linkage system for actuating the optical switch of FIG. 6 in a "momentary closure" mode.

An embodiment of a momentary closure optical switch is illustrated in FIG. 14. In this embodiment, an actuating lever 220 has one of it ends pivotably mounted at 222 and its other end connected to a resilient material 224 that is bonded to the diaphragm 70. The actuating lever 220 is pivoted, either directly or through a key or push button, to deflect the diaphragm until the actuating lever is released. The switch 18 is thus momentarily "closed" by pivoting the actuating lever 220. Considerations in fabrication of the embodiment of FIG. 14 include hysteresis, that is, changes in the shape of the resilient material 224 after the diaphragm 70 has been moved into one or the other positions, as well as stiffness of the resilient material 224 preventing easy movement of the diaphragm 70 for light actuating lever forces.

Figure 15:
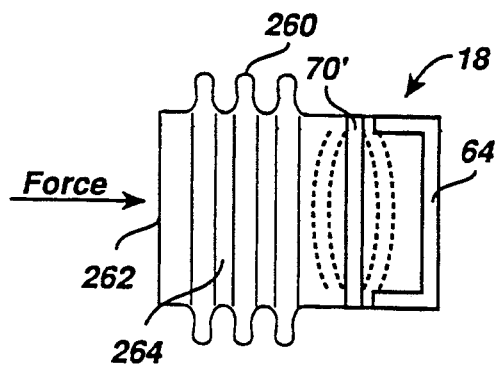
FIG. 15 is a schematic of a pressure linkage system for actuating the optical switch of FIG. 6.

FIG. 15 is a schematic of a pressure linkage system for actuating the optical switch of FIG. 6. The base 64 is mounted at one end of a bellows 260. The other end of the bellows 260 is closed by an end cap 262 so that the volume 246 is sealed from the external environment. As a result, manual actuation of the end cap 262 compresses the bellows 260, thereby reducing the size of the volume 246 enclosed by the bellows 260 and increasing the pressure in the volume 246 accordingly. This increased pressure deflects the diaphragm 70 mounted on the base 64 to close the optical switch.

The embodiments of FIGS. 13, 14, and 15 are three examples of a mechanical system for manually deflecting the diaphragm 70 of an optical switch 18. However, other systems that couple mechanical movement or forces to the diaphragm 70 are equally applicable and may also be advantageously used.

The optical switch illustrated in FIG. 6 may be fabricated using a variety of techniques. However, the small thickness of the cavity 72, both in absolute terms and in relation to the diameter of the diaphragm 70, presents special fabrication problems that must be dealt with. Normally, the cavity 72 will have a thickness of about 1 micrometer while the diameter of the cavity 72 will be about 200–1,000 micrometers. Conventional techniques for bonding using glue cannot be used to secure the diaphragm 70 to the substrate 62 because the high capillary pressure in the cavity 72 draws glue into the cavity. Furthermore, the bond between the sidewall 68 and the diaphragm 70 should preferably be as strong as the materials themselves. It has been found that an ionic bond, such as an anodic bonding technique, may be used when the diaphragm 70 is made of silicon and the substrate 62 is of a compatible glass-like material.

Although the optical switch may be fabricated using a variety of manufacturing techniques, one specific manufacturing technique is described below. The starting point is a glass wafer 0.011±0.001 inch thick of silicon-matching expansion glass such as Corning #7740 (Corning Glassworks, Corning, N.Y.). Both surfaces of the wafer are ground and polished to an optical finish. The glass wafer forms the substrate 62 of the switch 18.

The surfaces of the glass wafer are first cleaned by washing the glass wafer in hot, soapy water; rinsing it with clean water; etching and polishing it for one minute in a buffered HF solution composed of four parts of a mixture of 3 ml water and 2 g $NH_4F$ plus one part 48% HF solution; rinsing it again; and then baking it at 300° C. for one-half hour.

Using a conventional vacuum deposition process, a layer of chrome 200 Angstroms thick is then deposited on the glass wafer. This chrome provides a good adhesion surface for the subsequent application of photoresist to the glass wafer.

Photoresist, such as Microposit 1400-27 photo resist made by the Shipley Company, located in Newton, Mass., is then spin-coated on the chrome surface of the glass wafer at 3000 rpm; after which the coated glass wafer is baked at 90° C. for one-half hour.

Using conventional techniques, a photoresist mask is then prepared having an array of circles of a diameter equal to the desired diameter of the cavity 72, for example, 200 microns. The mask is aligned with the photoresist-coated surface of the glass wafer; and the mask and glass wafer assembly is then exposed. The exposed coated glass wafer is then developed with photoresist developer, such as Microdeposit 351CD-23 developer, made by the Shipley Company; rinsed in water; and dried.

As a result, unprotected circles 200 microns in diameter in the photoresist are left on the glass wafer. The chrome within the unprotected circles in the photoresist is lifted off with a chrome etch solution composed of one part HCl and one part glycerine, leaving circles of unprotected glass 200 microns in diameter on the surface of the glass wafer.

The circles of unprotected glass on the glass wafer are then etched for about 20 minutes at 69° F. with buffered HF solution to produce the cavity 72 in the substrate 62, which may be 1.27 microns deep. Even though the planar surface 66 of the substrate 62 is formed by chemical etching, it is still flat enough to form an adequate reflective surface 66 for the switch's optically resonant cavity 72.

Using conventional vacuum deposition techniques, a layer of titanium dioxide 200 Angstroms thick is then deposited on the surface 66 of each cavity 72 to increase the reflectivity of the surface 66. This layer significantly increases sensor operating range. This increases the intensity of the modulation of the output light of the switch 18. The remaining photoresist is then removed with acetone, and the chrome on the glass wafer is then removed with the chrome etch solution. Finally, the glass wafer is washed in water and air dried.

The diaphragm 70 covering the cavity 72 may be formed, for example, from a silicon wafer 3 inches in diameter, about 0.018 inch thick and etch-stopped with $10^{20}$ boron atoms/cc$^3$ at a depth of 4.0 microns, as sold by Diffusion Technology, Inc., of Milpitas, California 95035. Thus the silicon wafer comprises an etch-stopped layer 4.0 microns thick supported by a silicon substrate of much greater thickness.

The bonding procedure preferably utilizes an anodic bonding technique, as mentioned above, because glues and adhesives would be drawn into the relatively thin cavity 72 by capillary action. The etch-stopped side of the silicon wafer is provided with a layer of silicon dioxide about 200 Angstroms thick. The silicon dioxide is formed on the wafer by baking it in an oven at 900° C. for one hour in order to increase the subsequent adhesion of the glass wafer to it, as described subsequently. The silicon dioxide layer is required for reliable anodic bonding. Next, the glass and silicon wafers, which have been prepared as previously described, are cleaned with warm, soapy water; cleaned in an ultrasound bath for about 15 minutes; rinsed with water; rinsed with alcohol; and finally, air dried. The etch-stopped layer of the silicon wafer is then placed on and aligned with the surface of the glass wafer in which the cavity 72 has been formed to produce a silicon and glass wafer sandwich. The silicon and glass wafers are bonded together by first being placed in a conventional vacuum chamber with a positive electrode in electrical contact with the outer surface of the silicon wafer and with a negative electrode in electrical contact with the outer surface of the glass wafer; after which the vacuum chamber is evacuated to about $6\times10^{-6}$ torr for one hour. The silicon and glass wafer sandwich is then heated by a heater in the vacuum chamber to a temperature of 500° C., at which it is maintained. While the assembly is at this temperature, a bonding voltage is applied to the positive and negative electrodes. The bonding voltage is ramped from 0-800 VDC, maintained at 800 VDC for about 8-10 minutes until the bonding current is stabilized, and then turned off. At this time, the silicon and glass wafers are now bonded together with a fluid-tight seal, the silicon dioxide layer on the silicon wafer aiding in the bonding process. Next, the heater in the vacuum chamber is turned off; and when the silicon and glass wafer sandwich has cooled to about 300° C., the vacuum in the vacuum chamber is released. The bonded silicon and glass wafer sandwich is removed from the vacuum chamber when it has cooled to about 200° C.

After the silicon and glass wafer sandwich is removed from the vacuum chamber, 70-80% of the thickness of the silicon substrate of the silicon wafer is removed by mechanical polishing. Next, an EDP etchant solution is prepared composed of 8 ml water, 17 ml ethylenediamine, and 3 g pyrocatechol. The EDp etchant solution is heated to approximately 115° C. and used to chemically etch the pure silicon substrate away, leaving only its etch-stopped layer, about 4.0 microns thick, which is bonded to the glass wafer that forms the substrate 26. The 4.0-micron thickness is determined by periodically checking the thickness of the silicon remaining during the etching process, such as by measuring light transmission through the silicon.

As mentioned above, a light-reflecting coating is preferably applied to the surface 66 of substrate 62 and the inner surface 74 of the diaphragm 70. A light-absorbing coating is also preferably applied to the outer surface of diaphragm 70. The light-absorbing coating may be formed by using conventional vacuum deposition techniques to deposit two or more alternating layers of chrome and silicon on the outer surface of the diaphragm 70. A layer of chrome about 25 Angstroms thick is first deposited, followed by a layer of silicon about 100 Angstroms thick. The purpose of the light-absorbing coating is to prevent external light from entering cavity 72 through diaphragm 70.

We claim:

1. A spectrum shifting optical switch adapted to receive input light at a light port, said input light having a predetermined spectrum of wavelengths, said switch comprising:

a spectral modulation element movable between at least two positions to spectrally modulate said predetermined spectrum in at least one of said positions, thereby creating output light having respective wavelength spectrums indicative of the position of said spectral modulation element;

a manually actuatable member adapted to be actuated to alter the state of said switch;

a reflector directing said output light to said light port; and coupling means coupling said spectral modulation element to said manually actuatable member, thereby allowing said spectral modulation element to be moved between said positions to generate output light having corresponding wavelength spectrums whereby the state of said switch is indicated by the wavelength spectrum of said output light.

2. The optical switch of claim 1 wherein said spectral modulation element is at least one optical filter that is positioned between said light port and said reflector in a first state of said switch and removed from between said light port and said mirror in a second state of said switch, whereby input light from said light port passes through said filter and is directed by said reflector back through said filter to said light port as output light when said switch is in said first state.

3. The optical switch of claim 2 wherein said spectral modulation element further includes a second optical filter that is positioned between said light port and said reflector when said switch is in said second state.

4. The optical switch of claim 2 wherein said switch is of the multiple-pole type, including a second optical switch having at least one optical filter positioned between a respective light port and a respective reflector in a first switch state and removed from between said light port and said mirror in a second switch state, the optical filter of said first switch being connected to the optical filter of said second switch so that said filter elements move with each other responsive to actuation of said manually actuatable member.

5. The optical switch of claim 2 wherein said switch is of the multiple-throw type, including a second optical filter connected to and moving with said first optical filter, said second optical filter being positioned between said light port and said reflector when said switch is in a third switch state.

6. The optical switch of claim 2 wherein said manually actuatable member is a pivotally mounted lever and wherein said mechanical linkage is a relatively loose collar attached to said diaphragm, said collar allowing said pivotally mounted lever to freely pivot in said collar over a predetermined range, said lever being resiliently biased toward two opposed positions, one of said positions exerting a force on said collar toward said diaphragm, thereby inwardly deforming said diaphragm, and the other of said positions exerting a force on said collar away from said diaphragm, whereby said switch remains in the state to which it was last actuated.

7. The optical switch of claim 1 wherein said spectral modulation element is an optically resonant cavity having a thickness defined by a resilient diaphragm, said diaphragm being connected to said manually actuatable member by said coupling means so that actuation of said manually actuatable member moves said diaphragm between said two positions to alter the resonant wavelength of said cavity, said input light having a wavelength spectrum encompassing the resonant wavelength of said cavity and being directed through said light port into said optically resonant cavity and back to said light port as said output light, whereby the wavelength spectrum of said output light is the wavelength spectrum of said input light modulated by the resonant wavelength of said cavity corresponding to the position of said diaphragm.

8. The optical switch of claim 7, further including a light source generating light having at least one wavelength of a resonant cycle of said optical resonators, a light detector, and an optical system conveying light from said light source to said optically resonant cavity and from said optically resonant cavity to said detector so that said light detector generates an electrical signal corresponding to the optically resonant wavelength of said cavity, whereby the electrical output of said light detector varies as a function of the deflection of said diaphragm produced by actuating said manually actuatable member.

9. The optical switch of claim 8, further including an optical beam splitter coupling light from a first port to a third port and from said third port to a second port, said first port communicating with said light source, said second port communicating with said light detector, and said third port communicating with said optically resonant cavity, whereby light from said light source is coupled to said optically resonant cavity and from said optically resonant cavity to said light detector.

10. The optical switch of claim 9 wherein said light source generates light at a minimum of two wavelengths on a resonant cycle of said optical resonator, and wherein said light detector comprises:
a second optical beam splitter having a first port receiving light from said second fiberoptic waveguide and coupling said light from its first port to second and third ports;
a short wavelength pass filter receiving light from the second port of said second optical beam splitter, said filter passing light from said light source of at least one wavelength to a greater degree than light from said light source having longer wavelengths;
a long wavelength pass filter receiving light from the third port of said second optical beam splitter, said filter passing light from said light source of at least one wavelength to a greater degree than the light from said light source shorter wavelengths;
first and second photodetectors receiving light from said short and long wavelength pass filters, respectively, said photodetectors generating respective electrical outputs corresponding to the amplitude of the light received by said photodetectors; and
a calculator receiving the electrical outputs from said first and second photodetectors and generating an electrical output corresponding to a comparison therebetween, whereby the output of said calculator varies in amplitude according to the microshifts in the resonant frequency of said optically resonant cavity responsive to variations in the manually induced deformation of said resilient diaphragm.

11. The optical switch of claim 10 wherein said calculator is a ratio detector generating an output corresponding to the ratio between the electrical outputs from said first and second photodetectors.

12. The optical switch of claim 10 wherein said calculator is a differential circuit generating an output corresponding to the difference between the output of said first and second photodetectors.

13. The spectrum shifting optical switch of claim 7 wherein said coupling means includes a mechanical linkage connecting said manually actuatable member and said diaphragm.

14. The optical switch of claim 13 wherein the manually actuatable member is a pivotally mounted lever, and wherein said mechanical linkage is a body of resilient material extending between said lever and said diaphragm whereby manual actuation of said lever deforms said diaphragm inwardly for as long as said switch is actuated.

15. The optical switch of claim 7 wherein said coupling means and manually actuatable member include a resilient bellows having said optically resonant cavity mounted in and enclosing one end thereof and an end cap enclosing the other end thereof so that manual actuation of said end cap increases the pressure in said bellows thereby deflecting said diaphragm.

16. The optical switch of claim 1 wherein said switch is of the multiple-pole type, including a second optical switch having a spectral modulation element movable between at least two positions, said spectral modulation element being connected to the spectral modulation element of said first optical switch so that spectral modulation elements move with each other responsive to actuation of said manual)y actuatable member.

17. The optical switch of claim 1 wherein said switch is of the multiple-throw type in which said spectral modulation element is movable to a third position to generate output light having a respective wavelength spectrum indicative of said third position.

18. The spectrum shifting optical switch of claim 1 wherein said coupling means includes a mechanical linkage connecting said spectral modulation element to said manually actuatable member.

19. The optical switch of claim 1 wherein said coupling means includes a pneumatic circuit interconnecting said spectral modulation element and said manually actuatable member.

20. A spectrum shifting optical switching system comprising:
a light source generating input light having a predetermined spectrum of wavelengths;
a switch having a light port, a spectral modulation element movable between at least two positions to spectrally modulate the wavelength spectrum of light applied to said switch through said light port when said spectral modulation element is in at least one of said positions, a manually actuatable member adapted to be actuated to alter the state of said switch, a reflector directing light spectrally modulated by said spectral modulation element to said light port, and means coupling said spectral modulation element to said manually actuatable member;

optical coupling means coupling said input light from said light source to said light port and from said light port to a light detector port; and light detector means communicating with said light detector port, said light detector means generating an electrical output indicative of the spectral modulation of said input light by said spectral modulation element, whereby the output of sad light detector means is indicative of the position of said spectral modulation element.

21. The optical switching system of claim 20 wherein said light detector means comprises:

an optical beam splitter having a first port receiving light from said detector port and coupling said light from its first port to second and third ports;

a short wavelength pass filter receiving light from the second port of said optical beam splitter, said filter passing light from said light source of at least one wavelength to a greater degree than light from said light source having longer wavelengths;

a long wavelength pass filter receiving light from the third port of sad optical beam splitter, said filter passing light from said light source of at least one wavelength to a degree greater than the light from said light source having shorter wavelengths;

first and second photodetectors receiving light from said short and long wavelength pass filters, respectively, said photodetectors generating respective electrical outputs corresponding to the amplitude of the light received by sad photodetectors; and a calculator receiving the electrical outputs of said first and second photodetectors and generating an electrical output corresponding to a comparison therebetween, whereby the output of said calculator is indicative of the manually induced movement of said spectral modulation element.

22. The optical switching system of claim 21 wherein said calculator means is a ratio detector generating an electrical output corresponding to the ratio between the output from said first and second photodetectors.

23. The optical switching system of claim 21 wherein said calculator means is a differential circuit generating an electrical output corresponding to the difference between the electrical outputs from said first and second photodetectors.

24. The optical switching system of claim 20 wherein said spectral modulation element is an optically resonant cavity having a thickness defined by a resilient diaphragm, said diaphragm being connected to said manually actuable member by said coupling means so that actuation of said manually actuatable member moves said diaphragm between said two positions to allow the resonant wavelength of said cavity, and wherein said light source generates said input light having wavelength spectrum encompassing the resonant wavelength of said cavity.

25. The optical switching system of claim 20 wherein said spectral modulation element is at least one optical filter through which said input light passes only in a first state so that spectral modulation of said input light by said filter is an indication of the state of said switch.

26. A method of manually shifting between two states, comprising:

generating input light having a predetermined wavelength spectrum;

manually altering the position of a spectral modulation element between two positions so that said spectral modulation element spectrally modulates said input light in at least one of said positions; and detecting the spectral modulation of said input light in order to determine the position of said spectral modulation element.

27. The method of claim 26 wherein said input light is spectrally modulated by directing said input light into an optically resonant cavity having a thickness determined by the position of a resilient diaphragm.

28. The method of claim 26 wherein said spectral modulation element is an optical filter that is placed either in or out of said input light so that the wavelength spectrum of said input light is altered by said filter in one of said positions.

* * * * *

UNITED STATES PATENT AND TRADEMARK OFFICE
CERTIFICATE OF CORRECTION

PATENT NO.   :   4,991,925

DATED        :   February 12, 1991

INVENTOR(S)  :   Gordon L. Mitchell; Elric W. Saaski

It is certified that error appears in the above-identified patent and that said Letters Patent is hereby corrected as shown below:

In column 14, claim 16, line 40, please delete "manual)y" and substitute therefor --manually--.

In column 15, claim 21, line 23, after "port of", please delete "sad" and substitute therefor --said--.

In column 15, claim 21, line 31, after "received by", please delete "sad" and substitute therefor --said--.

Signed and Sealed this

Fourteenth Day of July, 1992

Attest:

DOUGLAS B. COMER

Attesting Officer

Acting Commissioner of Patents and Trademarks